Nov. 2, 1948.  A. J. GILLESPIE  2,452,921
TREAD SHOE

Filed Oct. 30, 1946  6 Sheets-Sheet 1

INVENTOR.
Alex J. Gillespie
BY
His ATTORNEY

Nov. 2, 1948.   A. J. GILLESPIE   2,452,921
TREAD SHOE

Filed Oct. 30, 1946   6 Sheets-Sheet 2

INVENTOR.
Alex J. Gillespie
BY
Frank M. Lough
HIS ATTORNEY

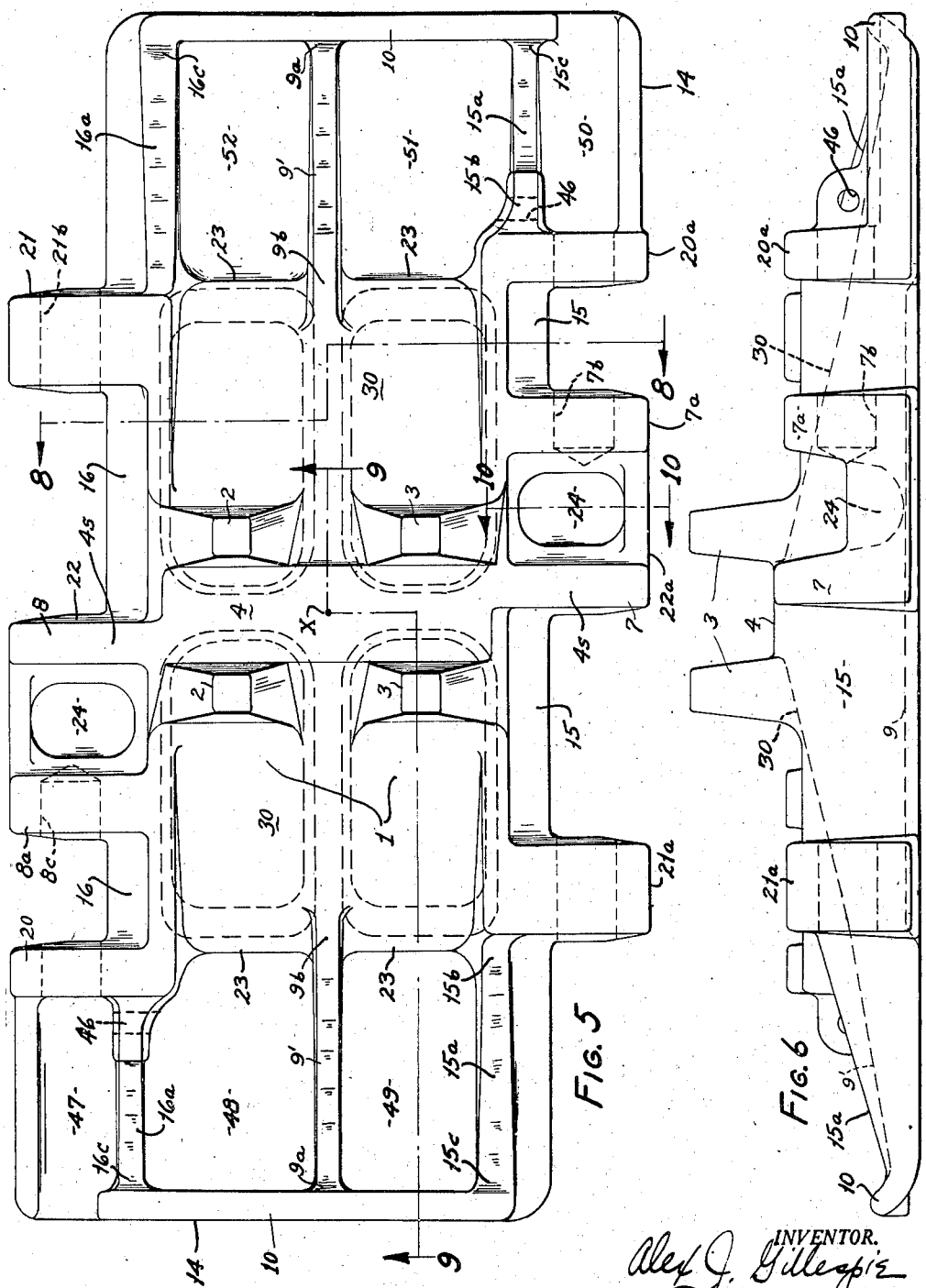

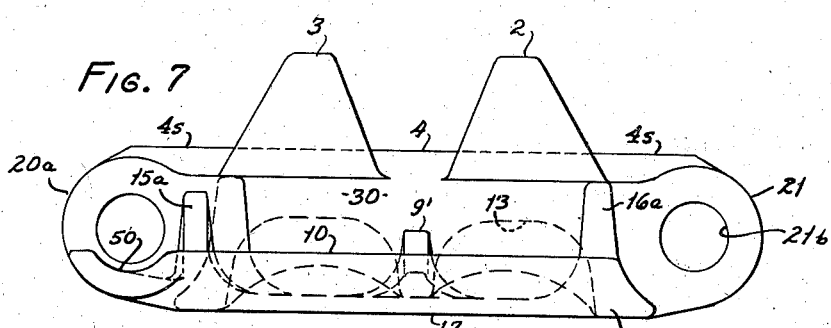
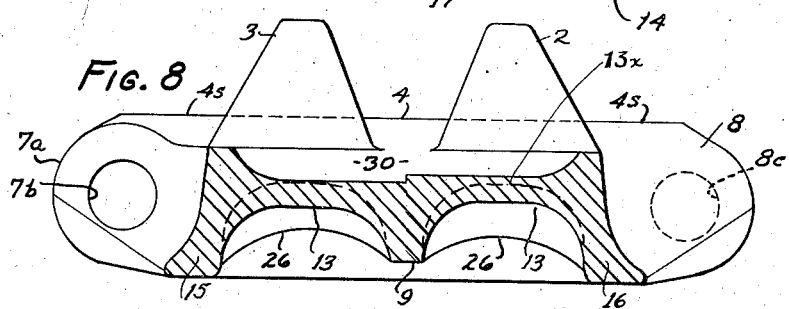
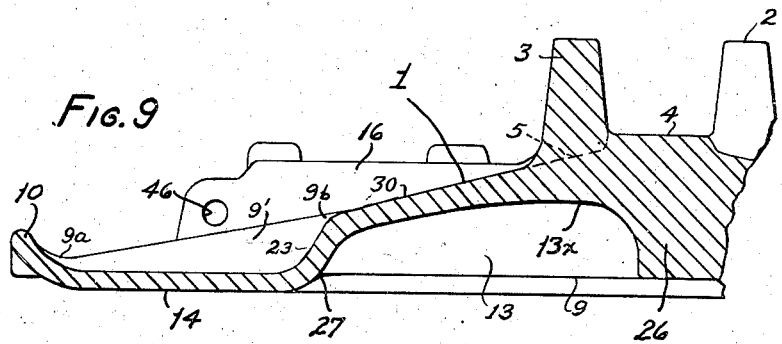
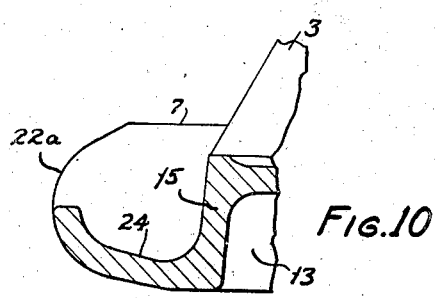

Nov. 2, 1948.　　　　　A. J. GILLESPIE　　　　　2,452,921
TREAD SHOE
Filed Oct. 30, 1946　　　　　　　　　　　　　6 Sheets-Sheet 5

INVENTOR.
Alex J. Gillespie
BY
His ATTORNEY

Nov. 2, 1948.  A. J. GILLESPIE  2,452,921
TREAD SHOE
Filed Oct. 30, 1946  6 Sheets-Sheet 6
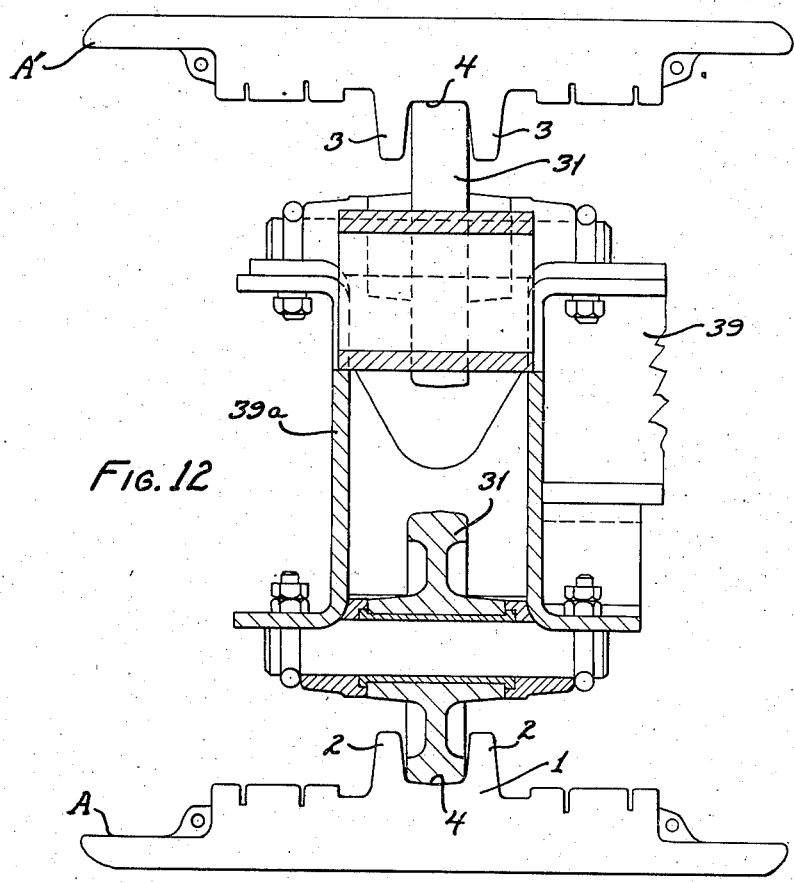
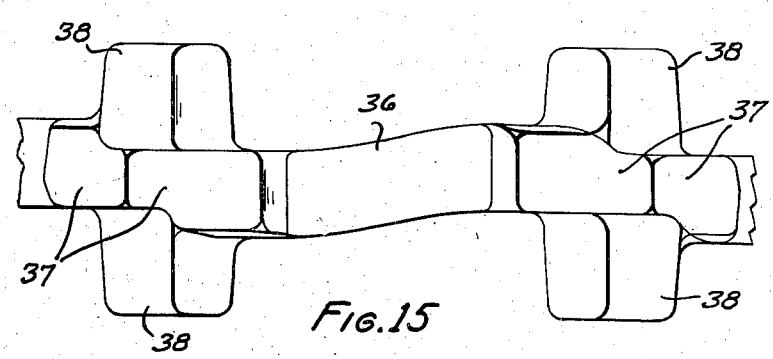
INVENTOR.
Alex J. Gillespie
BY
HIS ATTORNEY Patented Nov. 2, 1948

2,452,921

UNITED STATES PATENT OFFICE 2,452,921

TREAD SHOE

Alex J. Gillespie, Lorain, Ohio, assignor to The Thew Shovel Company, Lorain, Ohio, a corporation of Ohio Application October 30, 1946, Serial No. 706,587

7 Claims. (Cl. 305—10)

My invention relates to an improvement in tread shoes for vehicular endless tracks and relates more particularly to an improved tread shoe which may be substantially constructed by a forging process to so increase its strength that it may be employed in a track adapted to tractively support heavy work vehicles.

Commonly, track shoes for the aforesaid purpose are formed by a casting process and usually are of a construction wherein a considerable number of cored pockets are formed in order to reduce the weight of the casting; the formation of many of these pockets requires the use of large and intricate cores, many of which have been found difficult to clean out, and very commonly can not be well supported.

Although such cast shoes involve expensive manufacturing processes, yet the said cored pocket design was deemed necessary to achieve sufficient strength in such a cast shoe.

The shoe of the present invention can be made also by a casting process and when so made will be much more acceptable to the trade by reason of the elimination of the high core cost and of the attendant difficulties; although such shoe, when cast, involves a distinct improvement over prior cast shoes with which I am familiar, when made by a forging process it is quite obviously much stronger and is therefore to be preferred, where strength is a primary consideration.

The following are objects of my present invention:

To provide an improved continuous track tread shoe, which will be of maximum strength between the fore-and-aft hinge lugs, which will possess self-cleaning qualities of high degree, and at the same time will possess ample terrain engaging surfaces so formed as to be self cleaning and to achieve a high degree of "grip" with respect to the varying kinds of underlying terrain;

To provide an improved tread shoe so formed as to provide a series of load supporting arches and tension ribs disposed in an improved manner and adapted to withstand high tensile stresses which may be exerted upon the shoe during conditions of heavy usage and which, in other constructions, would tend to deform or rupture portions of the structure of the shoe disposed within the hinge points thereof;

To provide an improved shoe which, when used in continuous vehicular propelling tracks on highways in summer heat, will not objectionably imprint the outline of portions of its pavement engaging faces upon the pavement of such highways;

To provide an improved shoe for continuous track treads affording a high degree of operating efficiency which may be efficiently manufactured by a forging process at relatively low cost;

To provide an improved shoe adapted for production by a forging process at minimum expenditures of power and labor costs.

To provide an improved track tread shoe of increased utility which is achieved by its superior strength, which results from so disposing the different portions of the shoe in such manner that when the shoe is formed by a forging process a direction of grain flow of the metal is disposed substantially at right angles to the principal stresses developed in service;

To provide an improved track tread shoe of superior strength in those portions thereof which interconnect the forward hinge pin lugs to the rear hinge pin lugs, and to achieve increased resistance to stresses exerted in the horizontal direction during usage of an interlinked plurality of such shoes;

To provide an improved track tread shoe wherein the metal parts disposed between the fore-and-aft hinge pins are so disposed with respect thereto and so strengthened as to minimize the bending effects of off-center tensile stresses at times communicated from or to the most laterally disposed hinge lugs;

To so dispose the metal of the shoe in metal tie portions which comprise a link tension member of the least possible length between the fore-and-aft hinge lugs between which, in practice, maximum pulling stress effects are exerted;

To provide an improved track tread shoe capable of being formed in quantity production at low cost and by the use of forging dies which are not required to form abrupt deep depressions in either of the upper or lower shoe surfaces which would otherwise greatly decrease the life of the dies;

To provide an improved track tread shoe which may be rapidly produced by a forging process employing relatively light forging hammers, thereby effecting greater economy in production;

To provide an improved track tread shoe susceptible of such rapid production that the forging temperatures are thereafter continued to a sufficient degree to permit liquid quenching of the finished product to heat treat the same and without requiring reheating with attendant saving in cost;

Other objects of my invention and the invention itself will readily be apparent to those skilled in the art to which my invention appertains and by reference to the accompanying description of a preferred embodiment of my invention which is illustrated in the accompanying drawings whereof:

Figs. 5 and 6 are top plan and end elevational views respectively of the track shoe of Figs. 1 and 2;

Fig. 7 is a side elevational view of the said shoe;

Figure 11:
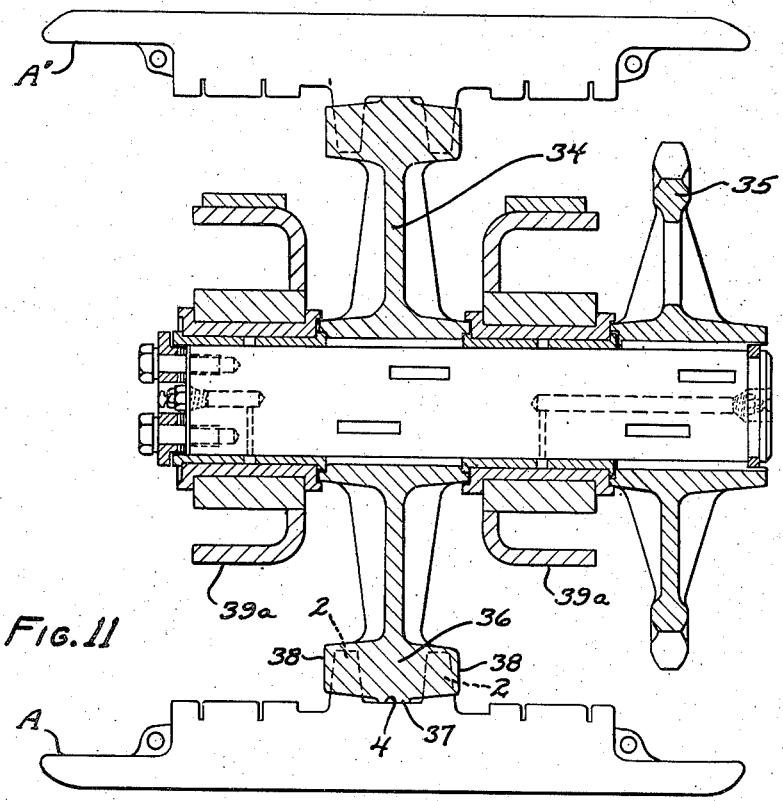

Figs. 8 and 9 are sectional views taken respectively on the lines 8—8 and 9—9 of Fig. 5;

Fig. 10 is a transverse sectional view of a fragment of the shoe taken on the line 10—10 of Fig. 5;

Fig. 11 is a medial transverse diametrical sectional view of a driving sprocket roller and associated driving sprocket with a continuous track comprising shoes of the said embodiment, said sprocket roller illustrated as being in operative engagement with overlying and underlying tread shoes of my present embodiment which shoes are herein shown only in outline;

Fig. 12 is a view similar to that of Fig. 11 illustrating an intermediate idler roller assembly with the rollers thereof disposed in operative engagement with the said overlying and underlying track shoes.

Figure 3:
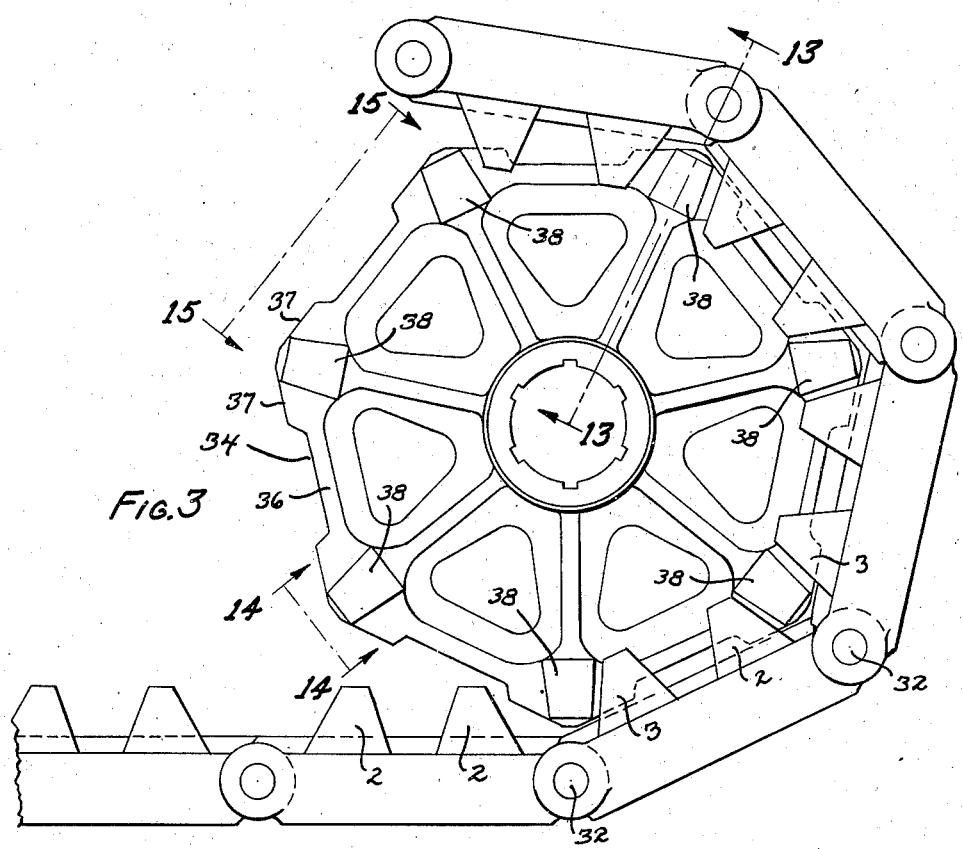
Fig. 3 is a side elevational view of a section of continuous track with several of the tread shoes thereof shown in operative relation to one of the vehicular sprockets which are adapted to be embraced by the continuous track employing a plurality of the tread shoes in Figs. 1 and 2.
Figure 13:
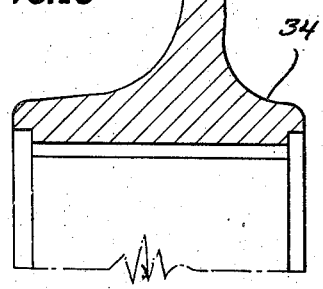
Figure 14:
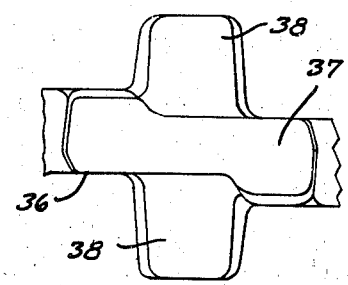

Fig. 13 is a section, and Figs. 14 and 15 are end views taken respectively from the lines 13—13, 14—14, and 15—15, all indicated in Fig. 3.

Each of the plurality of tread shoes, which are relatively interlinked at their front and rear ends, are specifically illustrated in Figs. 1 and 2, and 4 to 10 inclusive, and comprise an intermediate main platform portion, generally indicated as 1, of generally rectilinear outline, the upper side of said platform comprising upwardly and inwardly inclined sloping portions 30, which terminate in a medial flat track ridge 4, which extends from front to rear of the platform and includes flat track surface extensions 4s.

The extension track surface portions 4s are each of only one-half the width of the main portion 4 of the track, but the balance of the width of said extension surface portions is supplied in each case by disposing a rear track lug 7 of a forwardly adjacent shoe in lateral abutting relationship, with respect to a forward track lug 8 of a relatively rearwardly adjacent shoe, whereby the combined width of the track extension surfaces 4s are of substantially the same width as the main track surface 4.

Figure 4:
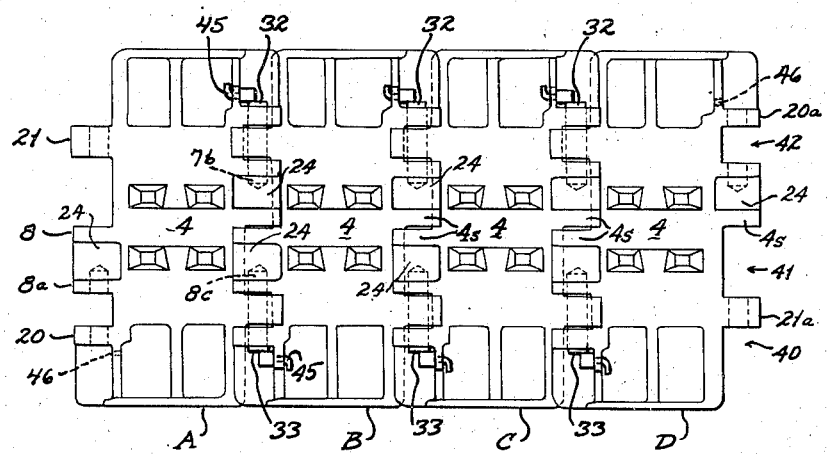
Fig. 4 is a top plan view of a plurality of the tread shoes of Figs. 1 and 2 in interlinked relationship for incorporation in a continuous track of the type shown in Fig. 3.

Thus a plurality of longitudinally aligned and interlinked track tread shoes as shown in Fig. 4 affords an articulated continuous track surface, which the various driving and idler rollers, which may be of the types shown in Figs. 3, and 11 to 15 inclusive, may rollingly traverse.

The shoe platform 1 affords a support for two pairs of substantially rack-type teeth, which project upwardly from portions of each slope 30 and are laterally merged at their bases with the lateral surface of the track 4. The teeth, preferably four in number, comprise a relatively front companion pair, 2—2, and a relatively rear companion pair 3—3, although, for convenience, the present description involves the assumption that the end of the tread from which the lugs 20, 22 and 21 are projected is the forward end, it will be first understood that, since the opposite end contains a precisely corresponding set of lugs 20a, 22a, 21a, respectively, the entire tread may be included in a continuous track with the aforesaid front and rear end portion reversed.

The drawings make it obvious that not only are the front and rear portions symmetrical and interchangeably reversible, but the tread is symmetrically formed in both directions along any vertical straight section which passes through a common central vertical axis such as that indicated at X in Fig. 5.

Also, for convenience, unless otherwise so stated in the following description, it is assumed that the tread is resting by its ground-engaging surface, shown uppermost in Fig. 2, and disposed in a horizontal plane with the traction teeth 2 and 3 normally projected upwardly from the medial portion of the platform.

Forwardly projecting traction lugs 20, 22 and 21, and the like rearwardly projecting lugs 20a, 22a and 21a are respectively based in the front and rear upright walls 16 and 15.

The said front and rear walls, together with the laterally and downwardly inclined walls 23—23 which provide downwardly directed skirt extensions of the lateral ends of the slopes 30—30 of the platform, together define the confines of a downwardly facing cavity, which is subdivided into four like cavity compartments 13, by the provision of the longer medial transverse rib 9 whose ends are merged in the walls 23—23, and the pair of relatively aligned short longitudinally extending rib portions 26, whose outer ends are merged in the front and rear walls 16 and 15, said longitudinal rib portions and said transverse rib being centrally relatively merged.

With the tread in normal upright position, the transverse rib 9 is downwardly and laterally curvilinearly expanded at its ends at 27 to afford a broadened area of merger with the walls 23, said rib 9 otherwise having its lowermost rib surface disposed substantially in a horizontal plane located somewhat above the level of the bottom and surfaces of the walls 23—23, and 15—16.

The longitudinally extending rib portions 26 have their downwardly facing surfaces disposed in the form of successive arches, and said surfaces are each of less width in their longitudinal medial regions, 26a.

In the vertical direction, both the rib 9 and the rib portions 26 are narrowest at their normally lowermost downwardly facing arched surfaces, their sides in the vertical direction being downwardly curvilinearly tapered to diminish their width in the downward direction to provide normally uppermost base portions of greatest width which are merged with the materials of the underside of the platform track portion 4.

The arched form of the lower surfaces of the rib portions 26 cause their inner ends which are merged with the transverse rib 9 to project downwardly substantially to the level of the downwardly facing lower surface of said transverse rib; in like manner the lower surfaces of the front and rear ends respectively, of the longitudinally extending rib portions 26, similarly extend concavely curvilinearly, from their uppermost central portion, in the downward direction to their lowermost point of merger respectively with the lower inner surfaces of the front wall 16 and rear wall 15.

The four like downwardly facing cavity compartments 13 are each thus provided with four wall surfaces each of which is continuously outwardly inclined with respect to its top wall surface. Due to the fact that the top wall surfaces of all said downwardly facing compartments are provided by the undersides of the sloping walls 30 visible from the top side of the platform, each of said surfaces curvilinearly slopes upwardly towards a region 13x, best shown in Figs. 8 and 9.

All surfaces of said compartment concavities are therefore readily reached by the impacting forging hammers, during deformation of the originally hot forging blank, to provide the rib 9 and rib portions 26, and the other wall portions 15, 16 and 23 affording compartment wall surfaces.

Tread plate portions 14 extend laterally from the previously described platform construction, each generally comprising a laterally extending tread portion 14, having a flat bottom surface, and being preferably provided with border portions in the forms of relatively short curvilinearly upwardly extending flanges 10.

The upper edges of the flanges 10 provide upwardly projecting longitudinally extending ribs at the two sides of the tread shoe, the upper surfaces of said side plate portions 14 being also provided with a series of laterally extending ribs 16a, 9' and 15a, these comprising strengthening extensions of rib portions of the platform.

Figure 1:
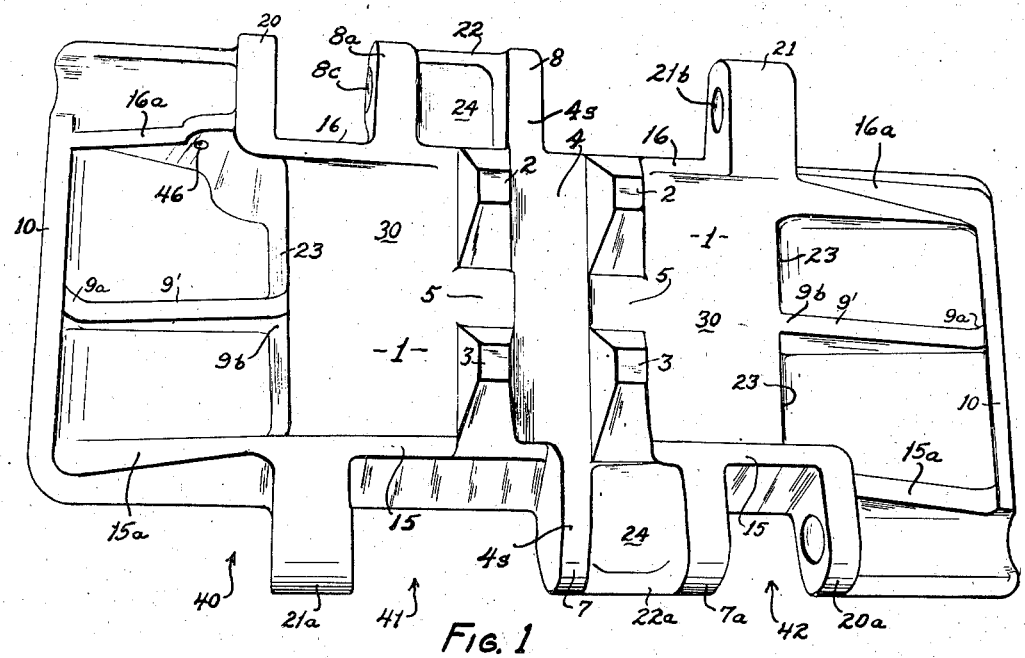
Figs. 1 and 2 are perspective views of a tread shoe embodying the principles of my invention, Fig. 1 being a view more particularly illustrating the upper surface, and Fig. 2 being a view more particularly illustrating the bottom surface of the shoe.
Figure 2:
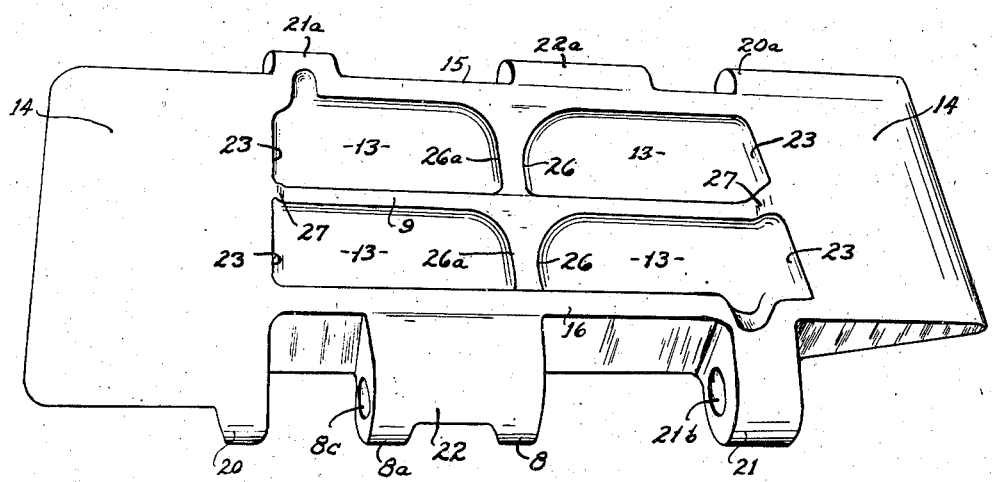

The rib portion 9' is laterally aligned with, and may be considered an extension of, the downwardly presented rib 9 which is shown in Fig. 2 as merging at 27 with the sloping platform wall 23, and the junction at 9b between the upwardly presented rib portion 9' with the same wall 23, comprises a merging juncture with the lateral ends of the downwardly presented rib portion 9 through the material of said sloping platform wall 23 of the platform, the junction being visible at 27 in Fig. 2 and at 9b in Figs. 1 and 5.

The rib portion 16a of the side plates 14 similarly are aligned with the front wall 16 of the platform and their inner ends are likewise mergingly joined with said front wall 16 through the intervening material of the roots of the traction lugs 21 and 20, similarly the ribs 15a may be functionally considered as lateral extensions of the rear wall 15 of the platform, as these are merged at their inner ends at 15b, with the lateral end portions of said rear wall through the intervening material of the bases of the traction lugs 21a and 20a.

All of said rib portions 16a, 9' and 15a are of least vertical thickness at their outer ends respectively at 16c, 9a and 15c, and are of maximum vertical thickness at their said inner ends.

In the fore and aft direction, as previously stated, the laterally sloping wall portions 23 which are disposed at the sides of the shoe platform 1, serve as ribs interconnecting the substantially longitudinally aligned traction lugs.

The traction lugs 20 and 21a are thus interconnected by the intervening wall 23 and the traction lugs 21 and 20a are interconnected by the intervening companion wall 23; the said walls thus provide longitudinally extending lug interconnecting ribs, and the said traction lugs serve as extensions of said ribs.

Similarly, the lugs 7 and 8 are longitudinally interconnected by the rib portions 26, which have arched bottom surfaces, as shown in Fig. 2, the upper surface of said ribs 26 affording the flat track 4 of Fig. 1, and the track extensions 4s being similarly afforded by the upper surfaces of the lug extensions 7 and 8.

Thus, we have in the track shoe of my invention, a system comprising three primary laterally extending ribs and three primary ribs which extend in the fore and aft direction, the transverse and longitudinal ribs being relatively intersecting and relatively merged at their junctions.

The upper surfaces of the shoe are generally inclined upwardly from the lateral portions of the shoe, and from the thus elevated mid-portion of the shoe, the traction teeth 2 and 3 project upwardly in pairs at each side of the elevated load supporting track 4.

It may be generally stated that like the cavity recess 13 at the under side of the shoe, all relatively recessed portions at the upper side of the shoe such as those shown at 24, 47, 48, 49, 50, 51, and 52 have their lateral wall surfaces so concavely curvilinearly formed that proceeding in all vertical planes intersecting such walls, the opposed portions of such walls are progressively, relatively more widely spaced apart proceeding in the upward direction, and expressed otherwise, all such recesses are of outwardly flaring form proceeding in the upward direction.

Conversely, with respect to all portions which project in the vertical direction outwardly from an opposing surface, are of diminishing transverse dimensions proceeding in the vertical direction from said base.

In other words, should either the upper or the lower side of the shoe be impressed into a plastically moldable material, separation of the molded material when hardened, may be readily effected without disrupting any of such material. Thus reverting to casting parlance, the two sides of the mold might readily sever as a matrix to cast a form which subsequently could be used as a casting matrix to reproduce a body having the form of that side of the shoe employed to form it.

From the above, one will understand that should it be desired to produce the shoe of my invention by a casting process this may readily be done without the necessity of employing casting cores. The above does not necessarily relate to the hinge pin receiving apertures and recesses as shown at 21b and 8c, which, while they could be made by utilizing such cores, are preferably formed by a drilling operation subsequent to production of the shoe.

The above description relating to a casting of the shoe of my invention is of particular importance, since the shoe formation which so lends itself to production by a casting operation without use of cores, and more particularly collapsible cores, the same kind of a shoe formation can be readily achieved by a forging process since forging hammers operable in the vertical direction, that is normal to the plane of the lowermost surface of the shoe, may be readily reciprocated to form all of the recesses present in the shoe formation, being without resistance readily reciprocable in both directions of movement.

The shoe formation above described and for like reason will readily eject stones, clay, mud and the like comprised in the terrain over which the vehicle may be propelled employing the track shoes of my invention.

It will be readily understood by those skilled in the art that idler rollers such as shown at 31 ride upon the track surface 4, Fig. 12, which track surface is continuous and endless when a sufficient number of the track shoes, some of which are indicated at A, B, C, and D, are interconnected as shown in Fig. 4, by the projection of hinge pins 32 and 33 which interlock the interfitted traction lugs of adjacent shoes together. In a similar manner, the driving wheel 34, shown in Fig. 11, which receives power from a chain driven sprocket 35, and a similar large idler roller at the other end of the track, not herein shown, traverses the same endless track 4—4.

The traction wheel 34 may be of the construction which is illustrated in Figs. 3 and 11 to 15 inclusive, or it may be of any of many existing variant forms to provide a rim portion 36 and track engaging tread surface 37 and laterally extending traction wall lug portions 38, the latter being adapted to interfit between successive pairs of teeth 2 and 3 of successive shoes.

It will be understood that the small type of idler wheels 31, as shown in Fig. 12, are interconnected by a frame 39a which is connected to the main truck frame 39 which carries all wheel rollers employed in the complete track assembly, such truck frame in various forms being well known in the art.

The companion wheels 31 of each pair of said small idler wheels are thus vertically interspaced a sufficient distance so that the lower one rests upon the track 4 of an upright track shoe A, Fig. 12, while the upper wheel 31 will support an uppermost track shoe A', by engagement of said wheel with the downwardly presented track surface 4 of such upper shoe, and the traction wheel 34, and an idler wheel, not shown, are so positioned respectively at the two ends of the looped track as to be partially embraced by the shoes at the ends of the track.

By interposing the forwardly disposed lugs 20, 8—8a, and 21 of one shoe respectively into the spaces 40, 41 and 42 of the next adjacent disposed track shoe, then by inserting the hinge pin 32 and 33, Fig. 4, from either side through the aligned apertures of the traction lugs 20 and 21 of the relatively rear shoe and 21a and 20a of the relatively forward shoe, the shoes are hinged together.

In the case of hinge pins first passed inwardly through the lug 20, the ends of said pins pass through a blind recess 8c in the lug 8a of the same shoe after passing through the interposed lug 21a of the next forwardly disposed shoe. In similar manner, the pin passing through the lug 21 will first be passed through a rear lug 20a of the forwardly disposed shoe, then through the lug 21 and into the blind recess 7b of the lug 7a.

Retaining pins 45, Fig. 4, are preferably projected through an aperture such as that shown at 46, rib 16a, or of the corresponding rib 15a, said pins passing through a transverse aperture projected through the heads of said hinge pins.

Thus, every pair of track shoes are relatively hinged together at their adjacent ends, with their longitudinally extending lugs so interspaced as to permit such interfitting as to provide an articulated joint substantially without leaving any substantial openings which otherwise would permit dirt to enter between the end portions of the shoes to an objectionable degree.

Having thus described my invention in a single embodiment and having explained the principles involved in my invention, I am aware that numerous and extensive departures may be made from the specific form of the embodiment herein disclosed, but without departing from the spirit of my invention.

I claim:

1. A tread shoe for an articulated endless track consisting of a unitary steel forging comprising a relatively elevated substantial rectangular platform portion, said portion having a pair of obtusely converging upper surface portions and a plane sprocket and idler roller track portion interposed therebetween, and extending between the front and rear ends of the platform, said upper surface portion comprising a top wall of a downwardly open box-like structure, having two side walls extending parallel with said track between the front and rear walls, a set of traction lugs extending outwardly of each said front and rear walls, a pair of ground engaging laterally extending flanges each based in and extending outwardly from the lowermost portion of a different one of said side walls, a rib extending in the fore-and-aft direction within said box-like structure and disposed below and upwardly merged with said roller track, a transverse rib also disposed within said box and mergingly intersecting the first said rib, the ends of both said ribs being merged with the inner surface of opposite of said walls, said box walls and said ribs together, providing the interior of said box structure into four downwardly facing substantially dome shaped recesses.

2. The tread shoe substantially as set forth in claim 1 characterized by the provision of at least three upstanding rib elements based in and extending upwardly from the upper side of each said laterally extending flanges and being aligned and merged at their inner ends with the ends of said front and rear walls and the first said rib being in an interconnecting relationship with, and substantially aligned with, pairs of forwardly and rearwardly extending of said sets of traction lugs to afford draw-bar connections therebetween.

3. A tread shoe for an articulated endless track comprising a unitary steel forging comprising a relatively elevated rectangular platform portion having a plane relatively elevated upper surface portion affording a sprocket and idler roller track extending medially of the platform sides, and between the fore and rear platform ends, a set of sprocket engageable teeth adjoining each side of said roller track surface in fore-and-aft interspaced relation, said teeth being upwardly tapered and rising above the level of the roller track, an upwardly extending platform supporting wall at each of the four sides of the platform, the platform comprising a pair of like portions each disposed at opposite sides of a different set of said teeth and sloping downwardly to its junction with an upper portion of one of the pair of lateral platform supporting walls, a pair of mergingly intersecting vertical ribs underlying the platform, each merged upwardly with the lower surface of the platform and respectively merged at their ends with different pairs of opposite of said walls, a set of transversely bored traction lugs, each presented outwardly respectively from front and rear walls and based therein, a pair of ground engaging flanges each based in and extending laterally outwardly from the lowermost portion of a different one of said side walls, three upstanding rib elements extending upwardly from the upper surface of each said flanges, two of said elements being respectively aligned with and affording continuations of the front and rear walls, the other element disposed medially between the other two elements being aligned with and affording a continuation of one of said intersecting ribs, said other rib underlying said roller track surface, and said ribs dividing the space below the platform into four substantially dome-shaped pockets.

4. A tread shoe for an articulated endless track consisting of a unitary steel forging comprising a relatively elevated substantial rectangular platform portion, said portion being so formed as to provide duplicated sets of upstanding upwardly tapered sprocket engageable teeth, and a transversely medial longitudinally extending planuiar track surface interposed between said sets of teeth, said platform portion extending laterally of said track surface by a pair of downwardly sloping portions, and affording a top wall of a downwardly open rectangular box-like structure having four supporting walls, opposite walls of which below the platform being interconnected by medially merged and intersecting ribs, said ribs being upwardly flared to merge with the underside of the platform, one of said ribs underlying said track surface, and said walls below the platform being upwardly inwardly flared to upwardly merge with the underside of the platform, and duplicated sets each of two hinge lugs inwardly based in and merged with ends of said side walls and respectively extending forwardly and rearwardly therefrom, and a pair of laterally extending supporting flanges for said platform, each inwardly merged with the bases of the laterally outermost of each set of hinge lugs and with portions of the front and rear platform supporting walls, and having substantially flat ground engaging surfaces at the lowermost level of the tread shoe.

5. A tread shoe for an articulated traction belt of a unitary steel construction, comprising a first set of three substantially parallel laterally extending upstanding ribs, and a second set of three substantially parallel longitudinally extending ribs, the outermost ribs of both sets affording four bounding walls of a downwardly open box-like structure, a substantially rectangular platform merged at its sides with upwardly disposed portions of said outermost ribs and medially provided with a relatively elevated longitudinally extending roller track disposed immediately above the intermediate rib of said second set, laterally outwardly extending flanges, based in the laterally disposed walls and having substantially flat ground engaging bottom surfaces at the lowermost level of said shoe, all said ribs having portions disposed within said structure provided with flaring ends and tops respectively merged in the material of said walls and said platform, and said rib portions disposed interiorly of the structure dividing said interior into four downwardly open substantially dome-shaped recesses, and outwardly projecting hinge lugs based in the front and rear walls of the structure.

6. A track shoe of the type described consisting of an integral forging, generally of rectangular lateral outline, but provided with a plurality of hinge lugs based in and extending from the front and also the rear side of the forging for affording hinge pin connection with corresponding lugs of adjacent shoes, and being considerably wider than long, said shoe comprising a central inverted box-like structure, four upstanding traction teeth relatively disposed in interspaced quadrilateral relation and collectively based centrally on the upper side of said structure, the interior of said structure affording a downwardly facing cavity, a pair of intersecting medially merged ribs disposed in the cavity and respectively extending laterally and longitudinally, the rib ends being merged with the inner surfaces of different pairs of opposite box walls, both ribs being upwardly merged with the under side of the box top wall and cooperatively dividing said cavity into four relatively lesser and shallower inverted recesses, the longitudinal medial portion of said top wall being upwardly thickened to afford a relatively elevated planular track interposed between the bases of different pairs of said teeth, the interior lateral and top surfaces of each said recess extending curvilinearly outwardly and downwardly throughout proceeding from an uppermost region, each said region underlying a different traction tooth base, the upper surface portions of said upper wall disposed at the two sides of said track being laterally oppositely and downwardly sloped therefrom to respective regions of merger with the upper portions of laterally opposite of said side walls, the longitudinally extending of said ribs underlying said track, and a pair of oppositely laterally extending flanges having substantially planular ground engaging lowermost surfaces being integrally merged with the lowermost portions of said box side walls.

7. A track shoe of the type described consisting of an integral forging, generally of rectangular lateral outline, but provided with a plurality of hinge lugs based in and extending from the front and also the rear side of the forging for affording hinge pin connection with corresponding lugs of adjacent shoes, and being considerably wider than long, said shoe comprising a central inverted box-like structure, four upstanding traction teeth and a relatively elevated longitudinally extending planular track based centrally of the upper side of the structure, said teeth being relatively disposed in interspaced quadrilateral relation and said track being interposed between the bases of different pairs of said teeth, said box structure affording a downwardly facing cavity, a plurality of strengthening ribs extending in different directions across the cavity and being relatively intersectingly intermediately merged with each other and being merged by their upper portions with the upper wall of the cavity and by their end portions with the inner surfaces of said walls thereof, said ribs subdividing the cavity into lesser shallower downwardly facing recesses, the walls of said recesses being downwardly and outwardly concavely curbed to make them substantially dome-shaped with the uppermost portions of each being disposed immediately below a base of a different one of said teeth and one of said ribs extending longitudinally of the shoe and underlying said track and a pair of oppositely laterally extending flanges having substantially planular ground engaging lowermost surfaces being integrally merged with the lowermost portions of said box side walls.

ALEX J. GILLESPIE.

REFERENCES CITED

The following references are of record in the file of this patent:

UNITED STATES PATENTS

| Number | Name | Date |
|---|---|---|
| 1,554,846 | Hanks et al. | Sept. 22, 1925 |
| 1,947,883 | Snyder | Feb. 20, 1934 |